United States Patent [19]
Takahashi et al.

[11] Patent Number: 6,026,758
[45] Date of Patent: Feb. 22, 2000

[54] METHOD FOR ANALYZING BUBBLE JET FROM A SHIP

[75] Inventors: Yoshiaki Takahashi, Tokyo; Yuki Yoshida, Kawasaki; Hiroharu Kato, Matsudo, all of Japan

[73] Assignees: Ishikawajima-Harima Heavy Industries Co., Ltd., Tokyo; Hiroharu Kato, Chiba-Ken, both of Japan

[21] Appl. No.: 09/078,950

[22] Filed: May 14, 1998

[30] Foreign Application Priority Data

May 30, 1997 [JP] Japan ................................ 9-142818
Mar. 6, 1998 [JP] Japan ................................ 10-055453

[51] Int. Cl.⁷ ........................................................ B63B 1/43
[52] U.S. Cl. ................................................................. 114/67 A
[58] Field of Search ................................ 114/67 A, 67 R

[56] References Cited

U.S. PATENT DOCUMENTS 5,594,180  1/1997  Carpenter et al. .................. 73/861.356
5,613,456  3/1997  Kuklinski ............................ 114/67 A

OTHER PUBLICATIONS

XP–002107590.
XP–002107591.
XP–002107592.
Patent Abstracts of Japan, Publication Number 09329109, Publication Date Dec. 22, 1997.
Patent Abstracts of Japan, Publication Number 09183396. Publication Date Jul. 15, 1997

*Primary Examiner*—Stephen Avila
*Attorney, Agent, or Firm*—Pearne, Gordon, McCoy & Granger LLP

[57] ABSTRACT

Distribution pattern of bubbles produced from a bubble jet of a ship is analyzed by approximating the bubbly flow as a continuous flow of a gas phase and treating the bubbles as diffusing particles dispersing in a flow of the gas phase.

13 Claims, 4 Drawing Sheets

METHOD FOR ANALYZING BUBBLE JET FROM A SHIP

BACKGROUND OF THE INVENTION

1. Field of the Invention

The present invention relates in general to methods for analyzing jetting bubbles generated by ship, and relates in particular to a method for analyzing effects of micro-bubbles on reducing skin-friction of ships.

2. Description of the Related Art

One of the known methods for reducing the skin-friction phenomenon on ships is a micro-bubble technique. Many bubbly flow models can perform computations of various properties of flow fields only if void fraction distributions are already known. Therefore, it is crucial to clarify the mechanism of void fraction distribution in bubbly flow in order to achieve accurate estimation of friction reduction effects. Furthermore, when it is desired to apply such a micro-bubble technique for friction reduction in actual situations, it becomes necessary, for design purposes, to estimate a void fraction which would be produced in a given bubbly flow field by varying the bubble supply rates during various computational processes. Therefore, from a viewpoint of practical applications also, knowledge of void fraction distribution in a bubbly flow is important for developing an analytical methodology.

For example, Guin et al. presented precision experiments involving bubbly flows in horizontal channels which demonstrated a close relationship of void fractions in near-wall surfaces to reduction in the skin-friction effects (Report A, "Reduction of skin-friction by micro-bubbles and its relation with near-wall bubble concentration in a channel", JMST, Vol. 1, No.5, pp.241–254, 1996). In their report, it is confirmed that, when the supply air volume flow is increased under a constant flow speed, the location of the peak in void fraction moves away from the wall.

Also, although different than the present study which relates to bubbles within the horizontal channel, there have been a study related to vertically ascending or descending bubbly flows. Sato et al. demonstrated that, while observing bubble behavior of low void fractions (at 5% of the peak value), small bubbles tended to move away from the wall surface at higher velocities (Report B, "A Bubbly flow Study: Report No. 2, Effects of water velocity and flow passage size on bubble behavior", Kiron, 43:2288-0296, 1977).

However, such observations are difficult to explain theoretically, on the basis of the lift force only, presented typically in Report C by Saffman ("The lift on a small sphere in a slow shear flow", JFM22:385-400, 1965). It is evident that conventional theories are not able to resolve the question of how to analytically treat the effect of bubbles on the behavior of a liquid phase in a bubbly flow.

Studies on formulating estimation equations are found, for example, in a Report D by Kataoka ("Modeling and prediction of turbulence in bubbly two-phase flow", 2nd. International Conference on Multi-phase Flow, '95, Japan, pp. M02-11-16, 1995). In this study, the flow volumes were computed from estimation equations based on experimental determination of void fraction distributions. However, a theoretical explanation was not offered for the mechanisms of developing void fraction distribution, and it remained as a topic to be resolved.

The present authors demonstrated a simple Lagrangian formulation from practical viewpoints (Report E, "Simple Lagrangian formulation of bubbly flow in a turbulent boundary layer, or bubbly boundary layer flow", JMST, Vol. 2, No. 1, pp. 1–11, 1997). In this study, a model for explaining the skin-friction reduction was presented involving a macroscopic expression for the effects of bubbles on turbulence in the liquid phase that assumed an average void fraction within a boundary layer.

SUMMARY OF THE INVENTION

It is an object of the present invention to provide a method for analyzing bubbles jetting from a ship in terms of approximating computations for void fraction distribution of bubbles within a horizontal channel.

It is a further object of the present invention to provide a governing equation for estimating void fraction distribution of bubbles.

It is a further object of the present invention to clarify the effects of supply air flow rate and flow velocity on the void fraction in a governing equation for void fraction distribution.

To achieve these objects, the present invention employs a means for analyzing a distribution pattern of bubbles, known as a void fraction distribution, in bubble jets produced from a ship by approximating a bubbly flow ejected from said ship as a continuous flow of a gas phase, and treating bubbles as diffusing particles dispersing in a continuous flow of a liquid phase.

By employing such a means, it is possible to get the analytical determination which agree qualitatively with the experimental determination.

DESCRIPTION OF THE PREFERRED EMBODIMENTS

In the following, an embodiment of the method for analyzing jetting bubbles of ships is presented with reference to the drawings. Various terms used in the equations are listed in Table 1. A subscript G is used to denote a gaseous state, L a liquid state and O a state without bubbles.

TABLE 1

| | |
|---|---|
| Q | Supply air flow rate [l/min] |
| $q_g$ | Ascending velocity of bubbles [m/s] |
| 2R | Channel height [m] |
| T. | Integral time scale [s] |
| $U_m$ | Average velocity inside channel [m/s] |
| $U_r$ | Frictional velocity [m/s] |

TABLE 1-continued

| | |
|---|---|
| $\bar{u}, \bar{v}$ | Average flow velocity [m/s] |
| u', v' | Turbulent flow velocity [m/s] |
| V | Bubble volume [m³] |
| Y | y-component of bubble displacement by least square averaging [m] |
| y | Vertical distance from upper wall [m] |
| α | Local void fraction |
| $\alpha_m$ | Average void fraction within a boundary layer |
| $\eta_m$ | A numerical constant |
| $\Delta\tau_t$ | Decrement in turbulent flow stress [N/m²] |
| δ | Boundary layer thickness [m] |
| κ | A Wall-Law constant in a turbulent flow region |
| $\kappa_1$ | As above (in liquid phase with bubbles) |
| $\kappa_2$ | As above (in gas phase) |
| $\lambda_m$ | A constant representing a level of a typical turbulence |
| μ | Viscosity coefficient [Pa × s] |
| ν | Dynamic viscosity coefficient [m²/s] |
| ρ | Density [kg/m³] |
| $a_1$ | A constant of proportionality representing turbulent flow direction |
| B | A Wall-Law constant in a turbulent flow region |
| $C_f$ | Local skin-friction coefficient |
| $d_b$ | Diameter of a bubble [m] |
| g | Gravitational acceleration [m/s²] |
| $j_g$ | Vapor phase flow flux caused by levitation force [m/s] |
| $j_t$ | Vapor phase flow flux caused by turbulence |
| $k_4$ | A constant of proportionality |
| $l_b$ | Vapor phase mixing-length [m] |
| $l_m$ | Liquid phase mixing-length [m] |
| $l_{mb}$ | Changes in liquid phase mixing-length |

Theory

First, the theoretical basis of the analytical approach will be explained. The balancing equations for flow fluxes in the present case are associated with the mixing-length model presented in our previous report in which the effects of bubbles are taken into account. Therefore, it should be noted that the effects of bubbles on the liquid phase is being considered when void fractions are computed. The variables effecting the behavior of this association are a change in the mixing-length $l_{mb}$ and a skin-friction ratio $C_f/C_{f0}$. These variables are computed using an average void fraction $\alpha_m$ existing within a boundary layer formed at a given rate of supply air flow.

(1) Coordinate System

Figure 1:
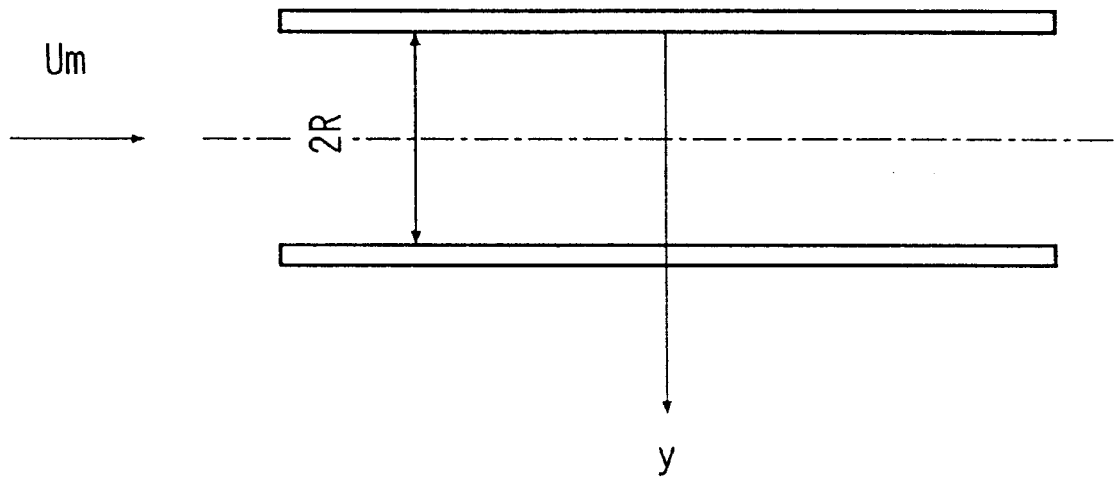
FIG. 1 is a plan view of a coordinate system for representing an analytical method of the present invention for analyzing jetting bubbles produced by a ship.

FIG. 1 shows the coordinate system used to analyze a flow field in the present embodiment. In this figure, y-direction refers to the plum direction (gravitational direction), 2R to a channel height and $U_m$ to an average velocity of bubbly flow. It can be seen, therefore, that the object flow field for analytical treatment is a fully-developed bubbly flow in a two-dimensional space given by the geometry of a horizontal channel. For example, an upper-side plate in FIG. 1 is equivalent to a bottom of the ship.

(2) Governing Equations

Next, the governing equation for estimating a local void fraction α in the object flow field will be explained.

In this study, a bubbly flow is approximated as a continuous flow of a gas phase and bubbles are considered to be diffusing particles dispersing within the liquid phase. The causal factors governing the bubble diffusion are: turbulence (mixing-length and turbulent velocity); gravitational force (or levitation force); and pressure gradient; and lift force, for example. When treating the bubbles as diff-using particles, velocity distribution does not need to be positively included as a causal factor. In other words, so long as the effects of the bubbles are expressed as their effects on generating the turbulence, an analytical formulation is possible, and as a result, it is possible to estimate a void fraction.

If the pressure gradient and the lift force are negligibly small in comparison with other variables, analytical solutions can be easily obtained. In this case, as a first step towards analytical formulation, turbulence and levitation are taken into consideration to generate analytical expressions, and the effects of other variables are then examined.

In a flow field that has reached a stationary state as a result of developing turbulence, a total sum of flow fluxes in the y-direction is zero, therefore, the following balancing equation (1) can be derived:

$$j_t + j_g = 0 \tag{1}$$

Figure 2:
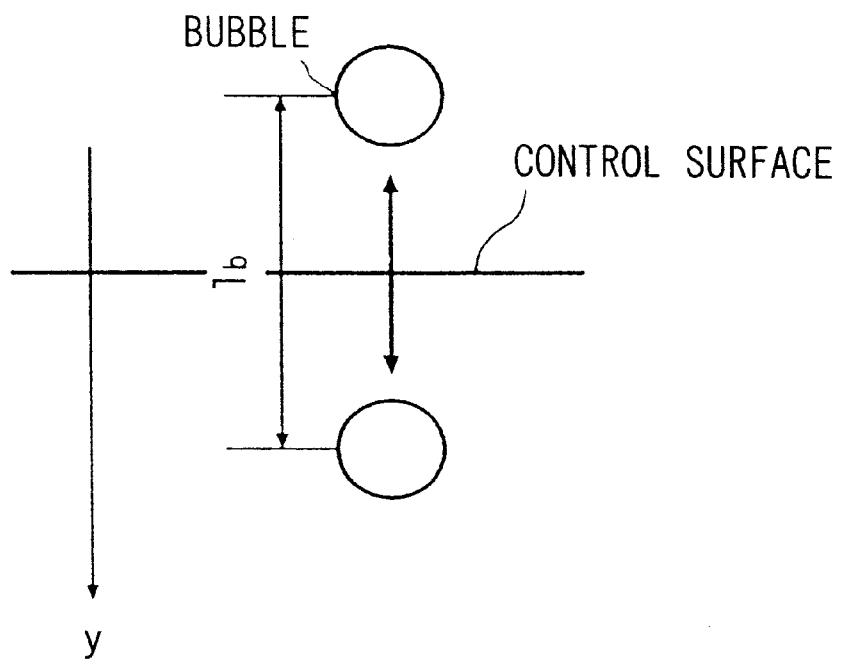
FIG. 2 is a model for representing bubbles near the control surface produced by jetting bubbles in the embodiment of the analytical method of the present invention.

Here, consider a control surface which is at right angles to the y-direction as shown in FIG. 2. In a stationary state, bubbles undergo oscillations over an average freedom range corresponding to a constant mixing-length $i_b$ with respect to the control surface. Therefore, if it is assumed that the diffusion direction is independent of y, then flow flux $j_t$ is expressed by equation (2), where $a_1$ is a constant related to the direction of turbulence, and if the flow field is isotropic, $a_1=1$.

$$\begin{aligned} j_t &= -a_1 l_b \frac{\partial}{\partial y}(\alpha v_b') \\ &= -a_1 l_b^2 \frac{\partial}{\partial y}\left(\alpha \frac{\partial \overline{u_L}}{\partial y}\right) \\ &= -a_1 l_b^2 \left(\alpha \frac{\partial \overline{u_L}}{\partial y^2} + \frac{\partial \alpha}{\partial y} \cdot \frac{\partial \overline{u_L}}{\partial y}\right) \end{aligned} \tag{2}$$

On the other hand, denoting the ascending velocity with $q_g$, the flow flux $j_g$ due to levitation force is give by equation (3).

$$j_g = -\alpha q_g \tag{3}$$

Therefore, substituting equations (2) and (3) in equation (1), the governing equation for local void fraction α is given by equation (4) shown below.

$$a_1 l_b^2 \left(\alpha \frac{\partial^2 \overline{u_L}}{\partial y^2} + \frac{\partial \alpha}{\partial y} \cdot \frac{\partial \overline{u_L}}{\partial y}\right) + \alpha q_g = 0 \tag{4}$$

Here, the mixing-length $l_b$ for the gas phase is expressed in terms of a change in the mixing length $l_{mb}$ given in Report E mentioned above. That is, a decrease in the shearing stress of the liquid phase caused by inclusion of bubbles is given by equation (5) shown below.

$$\Delta \tau_t = k_4 \rho_L \cdot l_{mb} \cdot \hat{v}_L' \frac{\partial \overline{u_L}}{\partial y} \tag{5}$$

This reduction in the shearing stress in the liquid phase may be considered to be equal to an increase in the shearing stress in the gas phase, in view of the action/reaction relationship between the liquid and gas phases; in other words, the change in the shearing stress is equal to a turbulent stress, and can be expressed as in equation (6) shown below.

$$k_4 \rho_G \cdot l_b \cdot \hat{v}'_G \frac{\partial \overline{u_G}}{\partial y} = k_4 \rho_L \cdot l_{mb} \cdot \hat{v}'_L \frac{\partial \overline{u_L}}{\partial y} \quad (6)$$

Further, by assuming that the average velocity in the gas phase is substantially equal to that in the liquid phase, the next equation (7) can be derived.

$$l_b = \sqrt{\frac{\rho_L}{\rho_G}} \times l_{mb} \quad (7)$$

Substituting equation (7) in equation (4), equation (8) is obtained.

$$a_1 \frac{\rho_L}{\rho_G}(l_{mb})^2 \left( \alpha \frac{\partial^2 \overline{u_L}}{\partial y^2} + \frac{\partial \alpha}{\partial y} \cdot \frac{\partial \overline{u_L}}{\partial y} \right) + \alpha q_g = 0 \quad (8)$$

In equation (8), the terms on the left side represent the effects of various variables; the first term relates to a turbulence gradient, the second term to a void fraction gradient and the third term to a levitation force, and the overall expression indicates a balanced state of the variables.

(3) Solutions

Next, solutions to equation (8) will be examined.

First, let us consider the mixing-lengths. In FIG. 1, the flow field may be approximated in such a way that the upper and lower halves are symmetrical about the center line, so that only the upper half needs to be considered. Also, it is assumed that the turbulent shear stress on the center line of the channel can be made zero, and that the velocity distribution follows a logarithmic law, thereby the mixing-length in the liquid phase $l_m$ may be expressed as in equation (9) given below.

$$l_m = \kappa y \sqrt{1 - \frac{y}{R}} \quad (9)$$

Also, when computing the change in the mixing-length $l_{mb}$ in the liquid phase, a constant $\kappa_2$, corresponding to a constant $\kappa$ in the Wall Law, can be expressed as in equation (10) shown below, using $\kappa_1 = \kappa - \eta_m(\alpha_m)^{2/3}$ which is equation 29 reported in our Report E.

$$\kappa_2 = \eta_m(\alpha_m)^{2/3} \quad (10)$$

where $\alpha_m$ is an average void fraction inside a boundary layer, and the constant $\eta_m$ is given by $\lambda_m/d_b$ in a stationary turbulent flow field, which can be approximated by an assumption $\eta_m \, \delta/d_b$ for bubbles of diameter $d_b$ mixed in a boundary layer thickness $\delta$. The method of deriving this approximation is given in the Appendix.

If the boundary layer thickness in the flow field under consideration is small in relation to the water tank in which the constant $\eta_m$ had been determined, the value may be decreased in proportion to a ratio of the thickness of the boundary layers, and conversely, if it is larger, the value may be increased in a similar manner.

Therefore, changes in the mixing-length $l_{mb}$ in the liquid phase is given by equation (11) shown below.

$$l_{mb} = \kappa_2 y \sqrt{1 - \frac{y}{R}} = \eta_m(\alpha_m)^{2/3} y \sqrt{1 - \frac{y}{R}} \quad (11)$$

Here, in the regions where the flow velocity distributions conform to a logarithmic law, the following equations (12) and (13) can be established.

$$\frac{\partial \overline{u_L}}{\partial y} = \frac{1}{\kappa_1}\left(\frac{U\tau}{y}\right) \quad (12)$$

$$\frac{\partial^2 \overline{u_L}}{\partial y^2} = \frac{1}{\kappa_1}\left(\frac{U\tau}{y^2}\right) \quad (13)$$

Substituting equations (11), (12) and (13) in equation (4) and transposing, equation (14) is obtained.

$$y\left(1 - \frac{y}{R}\right)\frac{\partial \alpha}{\partial y} = \left\{\left(1 - \frac{y}{R}\right) - K_0\right\}\alpha \quad (14)$$

where $K_0$ is an integration constant in the main flow with no bubbles and is given by equation (15) as follows.

$$K_0 = \frac{q_g\{\kappa - \eta_m(\alpha_m)^{2/3}\}}{a_1\rho_L/\{\rho_G U_\tau(\eta_m)^2(\alpha_m)^{4/3}\}} \quad (15)$$

Here, by replacing the partial differential $\partial$ with ordinary differentials $d$, i.e., assume that the local void fraction is a function only of the distance y from the upper wall in FIG. 1, equation (14) can be rewritten as equation (16) shown below.

$$y\left(1 - \frac{y}{R}\right)\frac{d\alpha}{dy} = \left\{\left(1 - \frac{y}{R}\right) - K_0\right\}\alpha \quad (16)$$

Equation (16) is a separable variables type differential equation, and the local void fraction α can easily be obtained. A solution is expressed in equation (17) shown below.

$$\alpha = K_1(y)^{-K_0+1}\left(1 - \frac{y}{R}\right)^{K_0} \quad (17)$$

where $K_1$ is an integration constant, and is obtained by integrating equation (17) in the y-direction so that the average void fraction obtained by integrating in y-direction equals the average void fraction $\alpha_m$ in the boundary layer under a given flow rate of supply air.

Computations

In the following, actual computational results for local void fraction α obtained using the derived equation (17) will be presented in some detail.

(1) Conditions

Computations were performed for a flow passage used in Report A, i.e., the height of the channel is 2R=10 mm and the internal flow patterns within such a channel was simulated in this study. Five cases of simulations were performed where the data on measured bubble diameters were available.

In the region below the center line in FIG. 1, the effects of both turbulence gradient and levitation forces may be considered to affect the induced velocities in the upward direction, so that it may be reasonable to assume that the bubbles concentrate in the region above the center line (inside the boundary layer, i.e., 0<y<0.005 m).

The conditions chosen are as follows: average flow rate $U_m$=4.5, 6.3 and 8.1 m/s; air supply rate $Q_G$=23, 40, 50 l/min. From Report A, representative bubble diameter for $U_m$=4.5 m/s is $d_b$=700 µm; and representative bubble diameters for $U_m$=6.3 and 8.1 m/s are $d_b$=500 µm. The governing equation for frictional velocity $U_\tau$ is obtained from Report E as equation (18) shown below.

$$\frac{U_m}{U_\tau} = \frac{1}{\kappa_1} \ln\left(\frac{U_\tau R}{\nu_L}\right) + B - \frac{1}{\kappa_1} \quad (18)$$

Here, it is known that the frictional velocity is defined as $U_\tau = (\tau_\omega/\rho)^{1/2}$ where $\tau_\omega$ is a wall surface friction stress and $\rho$ is the density, and the frictional resistance is defined as $C_f = \tau_\omega/(\frac{1}{2}\rho U_0^2)$ where $U_0$ is the main flow velocity without bubbles. Choosing the constants B, $\kappa$ in the Wall Law as B=4.9 and $\kappa$=0.41, respectively, skin-friction ratio $C_f/C_{f0}$ is given by equation (19) shown below.

$$C_f/C_{f0} = (U_\tau/U_{\tau 0})^2 \quad (19)$$

According to a well known Klebanoff's reference on properties of turbulent flows ("Dynamics of Viscous Liquid", Muroi Takebumi and Inoue Yoshihiro, Rikogakusha), the proportionality constant $a_1$, relating the a turbulent flow in the y-direction at right angle to the main flow direction, is 0.5~1 times that in the main flow direction, so, a representative value of $a_1$=0.75 was chosen in this study.

The constant $\eta_m$ was determined to be $\eta_m$=0.85 from experiments performed in a cavitation water tank (cross sectional dimensions: 600×600 mm) reported in Report E (Ishikawajima-Harima Co Ltd.). In these experiments, it was observed that the thickness of a well-established boundary layer was of the order of 50 mm, and in the present channel, a corresponding value is about 1/10. Because the flow velocity is in the same range, the bubble diameters were assumed to be about the same, and $\eta_m$ was chosen as 0.085.

A balancing equation between levitation and resistance is expressed by equation (20) shown below by using the ascending velocity of the bubbles $q_g$ and the resistance coefficient of the bubbles according to Stokes.

$$6\pi\mu_L(d_b/2)q_g = \rho_L g V \quad (20)$$

Based on equation (20), the ascending velocity of the bubbles $q_g$ was determined from equation (21) shown below.

$$q_g = \rho_L g V/\{6\pi\mu_L(d_b/2)\} \quad (21)$$

(2) Calculation Results

Using the conditions specified above, numerical calculations of the distribution of local void fraction $\alpha$ were performed according to equation (17).

Figure 3:
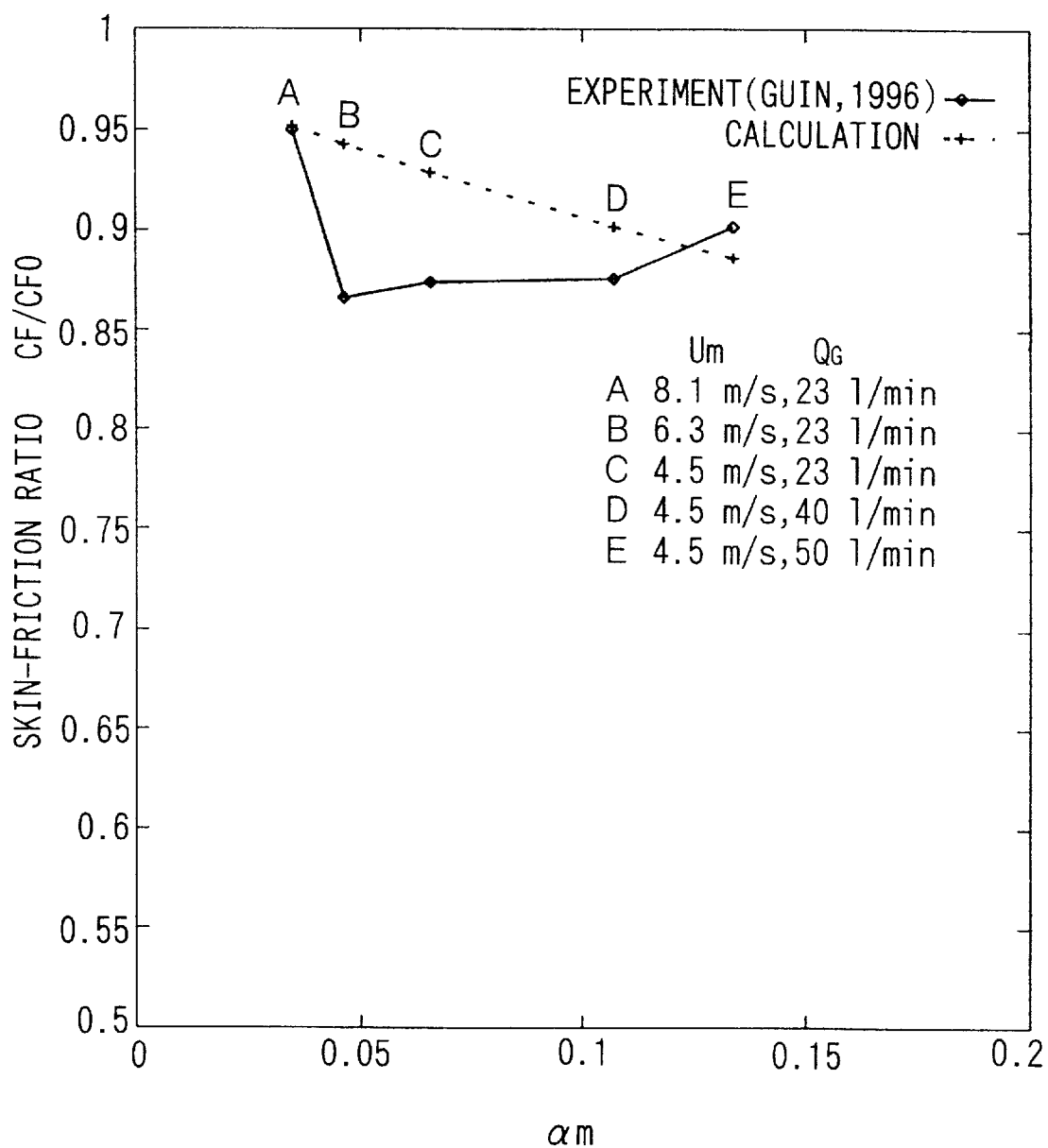
FIG. 3 is a graph showing computed results of skin-friction ratio $C_f/C_{f0}$ in the embodiment of the analytical method of the present invention.

First, FIG. 3 shows the calculated results for skin-friction ratio $C_f/C_{f0}$. In this graph, the results reported by Guin in Report E are also shown for comparison. It is seen that the calculated results agree, in their order of magnitude, with experimental values measured by Guin. Measured results show a tendency that, with increasing volume of air flow up to a certain level, the effect of air flow on skin-friction ratio $C_f/C_{f0}$ becomes saturated, and with further increase in the air flow, this tendency is reversed and the ratio $C_f/C_{f0}$ begins to increase, indicating less effectiveness in lowering friction resistance. However, our calculations did not show this tendency.

There may be two reasons that the theory did not show this tendency. One reason may be that the calculations do not represent local conditions of flow in the y-direction. The other possible reason may be that, in some localities, actual state of flow at higher void fractions is not bubbly flow, and the present theory does not take such a state into account.

Figure 4:
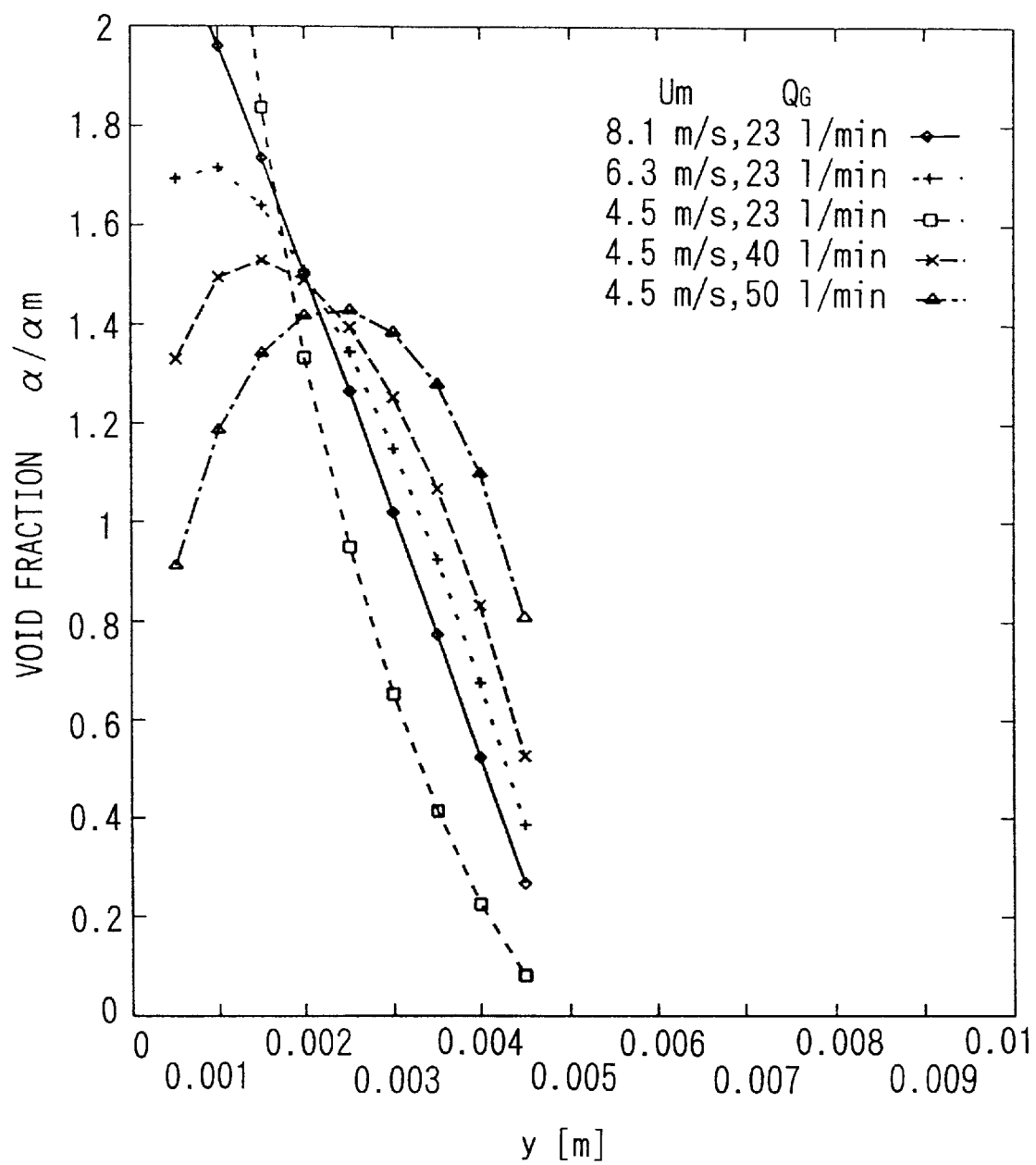
FIG. 4 is a graph showing computed results of distribution of local void fractions normalized by the average void fraction in the embodiment of the analytical method of the present invention.

Further results are shown in FIG. 4 for calculated results of the distribution of local void fraction $\alpha$ normalized by the average void fraction $\alpha_m$ existing inside the boundary layer. Because of the calculation conditions adopted in this study, void fraction distribution appeared only in the region above the center line (in the boundary layer: 0<y<0.005 m).

Calculations shows that, as the flow velocity is reduced from a value of 8.1 m/s, the effect of reduction in local void fraction begins to show extensively, and that the peak in the void fraction tends to move in a direction away from the wall. When the velocity is reduced to 4.5 m/s, because the bubble diameters become larger, an increase in the levitation effects becomes apparent, and the void fraction peak starts to move closer to the wall. When the air flow volume is increased while keeping the flow velocity constant at 4.5 m/s, it is seen that the average void fraction increases and the void fraction peak moves away from the wall.

Figure 5:
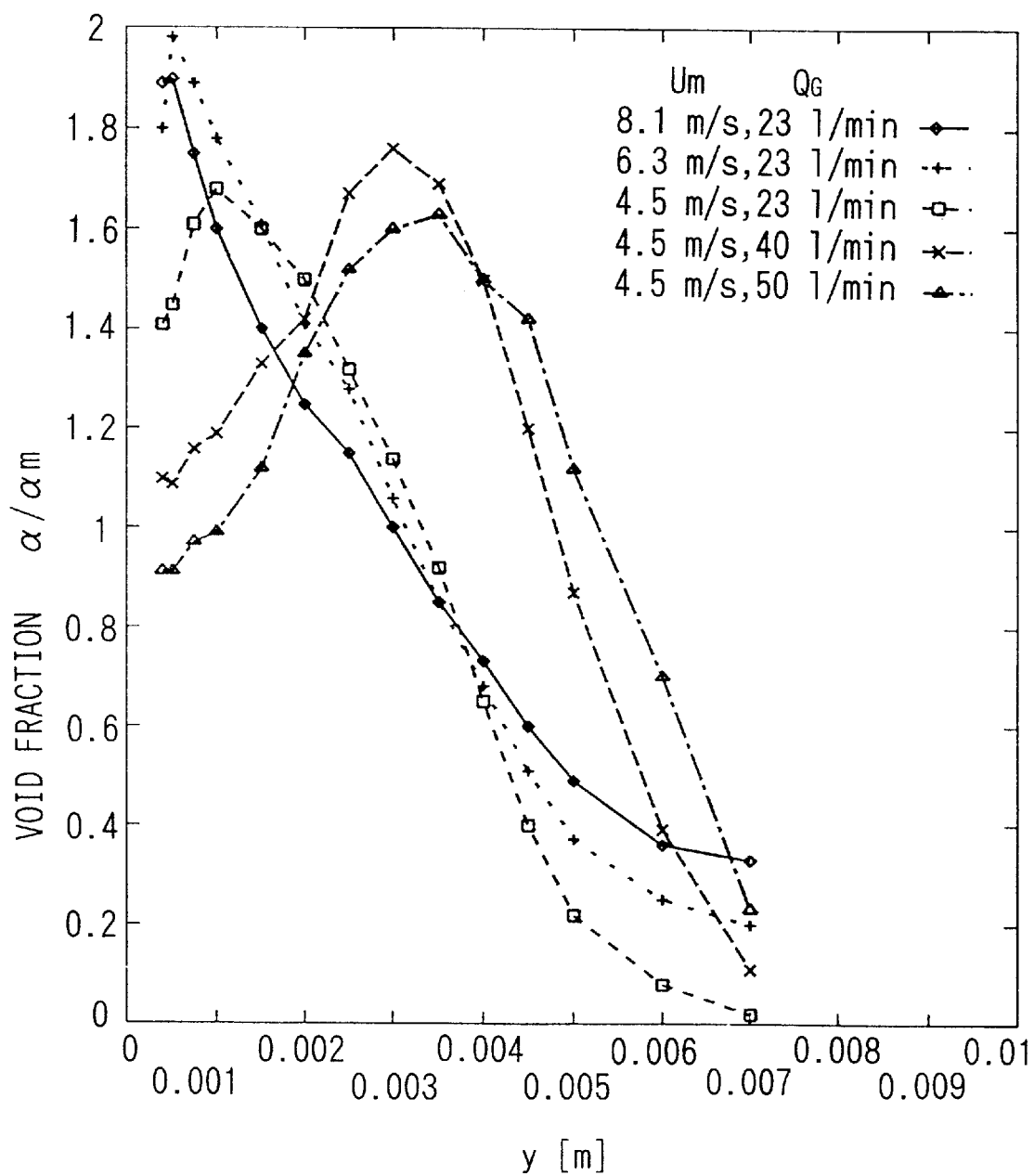
FIG. 5 is a graph showing the experimental results of void fraction distribution presented in Report A.

FIG. 5 shows the experimental results reported in Report A, and it can be seen that the present results agree well qualitatively with those in Report A.

Discussion (1) Void Fraction Distribution

Void fraction distribution pattern divides broadly into two types, depending on whether in equation (17) the exponent $(-K_0+1)$ of the distance parameter y is positive or negative. That is, $K_0 \geq 1$ indicates a condition that either the average velocity inside the channel $U_m$ is high or the average void fraction $\alpha_m$ is small, and levitation effect and turbulence gradient effects are not balanced in equation (4) at any value of the distance y so that the bubbles become concentrated on the wall. When $K_0 < 1$, the state of flow is opposite to the one described above, such that levitation effects and turbulence gradient effects in the governing equation (4) are balanced at some point, and the void fraction peak appears in a location away from the wall.

Comparing the calculated results in FIG. 4 with experimental results in FIG. 5, it can be seen that equation (17) roughly reproduces the broad tendency for the void fraction distribution to divide into two types. However, when the air flow volume is high and the void fraction peak begins to appear near the center line of the flow passage, the difference between theory and experiments becomes noticeable, because the effect of a void gradient is not reflected in the regions below the center line in the present method.

(2) Frictional Resistance and Scaling Effects

Because void fractions are calculated by considering the effects of bubbles on the liquid phase, frictional resistance or skin-friction is inevitably obtained in the course of computation. In performing computations, the constant $\eta_m$ applicable to a small water tank used in the present case was obtained by scaling down the constant $\eta_m$ reported in Report E by a factor of 1/10, by considering the boundary layer thickness produced in a large water tank.

Discussion of scaling effects is made much more pertinent if a representative parameter of a flow field, such as the boundary layer thickness, is chosen to be the reference for scaling. From such a viewpoint, the model presented here is considered to be extremely practical. Furthermore, in view of the fact that the calculated results largely agree with experimental results reported as seen in FIG. 3, it may be considered that the present model is fairly consistent. Therefore, it is reasonable to consider that an important consideration in scaling is related to a physical quantity proportional to the constant $\eta_m$, i.e., the thickness of a boundary layer in relation to the bubble diameters.

(3) Model Testing of Ships

Next, modeling experiments for evaluating the resistance of ships in a bubbly flow will be discussed. To reproduce the same skin-friction ratio $C_f/C_{f0}$ in modeling tests in testing of an actual ship, it is necessary to match the constant $\kappa_2$ in the Wall Law, i.e. (boundary layer thickness/bubble diameter)× (average void fraction)$^{2/3}$, as well as the Reynolds number to those that apply to actual ships.

It is unrealistic to hope to match the Reynolds numbers, and it is also problematic to match $\kappa_2$. Upon examining the bubble diameter measurements presented in Report A, it is possible to think that the bubble diameters in a well developed flow are affected largely by the velocity. Therefore, in modeling test, which is smaller in scale compared with the scale of the actual ship, the bubble diameters become correspondingly small.

In the meanwhile, the thickness of the boundary layer in modeling test is thinner compared with that in actual ship because of its short length. Therefore the lowering effects on the skin-friction would appear to be less even if the average void fractions $\alpha_m$ can be made identical, because the constant $\eta_m$ in modeling test is smaller than the actual ship. Also, one could consider raising the air flow volume to increase the average void fraction $\alpha_m$, but there will be a limit to this approach from a viewpoint of maintaining the dynamics of bubbly flow.

Because of all these limiting factors, it is considered difficult to reproduce the same skin-friction ratio $C_f/C_{f0}$ in modeling test as in actual ships. However, it is possible to develop an analytical methodology for a model ship and to verify the theory by experiments, then a similar theory may be developed for actual ships. This approach remains as a topic of future study.

(4) Vertically Rising Pipe

The discussion is continued to examine how the distribution of actual void fraction can be explained in a vertically rising pipe. In this case, it is thought that levitation does not affect in the y-direction but affects in the downstream direction, and that the bubbles rise faster than the liquid. It is known that void fraction peaks appear near the wall, particularly at low fluid velocities.

In other words, levitation-assisted bubbles develop a higher velocity relative to the liquid such that if the bubbles enter into the boundary layer which exhibits shear flow, then a lift force is generated. The lift force operates in the direction toward the wall so that, under the influence of the lift force, the frequency of bubbles passing through a given cross sectional area becomes much higher near the wall than near the center line section. In the present case, it has been assumed that the parameters of pressure gradient and lift force can be ignored to facilitate analysis; however, the role of the pressure gradient and lift force may be examined in governing equations for a low velocity vertically rising pipe. At this stage, this approach remains as a future topic of investigation to be confirmed by experimentation.

Conclusions (1) The present study attempted to explain the phenomenon of void fraction peak, in a bubbly flow moving in a horizontal channel, to appear near the wall surface at low air flow rates and away from the wall surface at higher air flow rates. As a result, an analytical expression has been developed by considering a balance between levitation and turbulence effects in an overall governing equation. A governing expression for void fraction distribution, which appears to be simply applicable to practical situations, has also been derived.

(2) Experimental results and analytical results for void fraction distribution calculated from the governing equation agree well qualitatively. However, estimation is less accurate near the outer edges of the boundary layer, and therefore, choices for suitable boundary conditions remain to be investigated further.

(3) The method of calculating the skin-fiction ration $C_f/C_{f0}$ presented in Report E is found to be applicable to the bubbly flow in the present case having a different representative channel length. In other words, two flow fields of different scale factors can be treated systematically using the same analytical methodology. This indicates that boundary layer thickness and bubble size may be critically linked in determining the precision of scaling.

Appendix

Lastly, supplementary explanation will be provided for derivation of $\eta_m \delta/d_b$. First, a change in the mixing-length $l_{mb}$ is expressed by equation (22) shown below.

$$l_{mb} = \kappa_2 y = \eta_m (\alpha_m)^{2/3} y \tag{22}$$

Also, equations (23), (24) and (25) can be established.

$$\eta_m y = (\lambda_m / d_b) y = 1 / d_b (\lambda_m y) \tag{23}$$

$$\begin{aligned}\lambda_m y &\propto v_L T_{*L} \tag{24}\\ &\propto v_L (k_L / \varepsilon_L) \\ &\propto v_L (k_L^{2/3} / \varepsilon_L)(k_L)^{-1/2} \\ &\propto v_L l_m (v_L')^{-1} \\ &\propto v_L (\partial \bar{u}_L / \partial y)^{-1} \\ &\propto v_L \kappa_1 (y / U_\tau) \\ &\propto \kappa_1 (y / y^+) y \end{aligned}$$

$$\lambda_m \propto \kappa_1 (y / y^+) = \kappa(y / y^+) + O(y^2 / y^{+2}) \tag{25}$$

Here, $(y/y^+)$ can have any value, but a value $y^+ = 1200$, in the outer edge of the turbulent region, is used in this case, and $y/\delta$, is chosen to be 0.35, and these values are substituted in equation (25). When the values beyond $(y^2/y^{+2})$ are ignored, equation (26) is established.

$$\lambda_m \delta \tag{26}$$

When equation (26) is substituted in equation (23), the constant $\eta_m$ is obtained in the following expression.

$$\eta_m = \lambda_m / d_b \, \delta / d_b \tag{27}$$

Additional Items

As demonstrated above, it has been confirmed that proper scaling in two flow fields of different scales can be performed by assuming that the constant $\eta_m$ is proportional to the boundary layer thickness $\delta$, and making correction in such a way that, when the present boundary layer thickness $\delta$ is less than the experimental boundary layer thickness observed in a water tank in which $\eta_m$ has been determined, the constant $\eta_m$ is correspondingly made smaller. If the present boundary layer thickness is thicker, then the correction is correspondingly made larger. For example, in the present calculation, an experimental constant (0.85) obtained in a cavitation water tank was reduced by 1/10th so that the present constant $\eta_m$ was chosen to be 0.085.

In other words, the boundary layer thickness δ is adjusted depending on the sizes of water tank, ship and flow field. It is possible to calculate skin-friction ratios $C_f/C_{f0}$ at various locations along the x-direction for different sizes of flow field using equation (17) for local void fraction α and equation (19) for boundary layer thickness, by defining local void fraction α as well as adjusting the constant $\eta_m(\delta/d_b)$.

In the above example, a reference value of 0.85 obtained from experiments conducted in a cavitation water tank was used for the constant $\eta_m$; however, it is not necessary to limit to experimental results. For example, it is considered possible to theoretically calculate the boundary layer thickness δ and micro-bubble diameter $d_b$ and then, using the theoretical results, to determine a reference value for the constant $\eta_m$.

As explained above, the present method of analyzing the effects of jet bubbles on reducing the skin-friction of ships, the following features should be noted.

a. Analytical results agree qualitatively with experimental results on bubbly flow flowing in a horizontal channel.

b. A governing equation for void fraction distribution has been derived, which is simple to be applied to practical situations.

c. The skin-fiction ration $C_f/C_{f0}$ in two flow fields of different scale factors can be calculated systematically using the same analytical methodology.

What is claimed is:

1. A method for analyzing a distribution pattern of bubbles in a turbulent boundary layer, known as a void fraction distribution, in bubble jets produced from a ship by approximating a bubbly flow ejected from said ship as a continuous flow of a gas phase, and treating bubbles as diffusing particles dispersing in a continuous flow of a liquid phase.

2. A method according to claim 1, wherein said void fraction distribution, indicating a bubble distribution pattern, is calculated according to an analytical formulation for treating effects of bubbles in terms of actions of bubbles on a turbulent flow of said liquid phase.

3. A method according to claim 2, wherein said void fraction distribution is calculated according to a balancing equation 1 expressing a state of static balance, in a turbulent flow, between a turbulent flow flux, $j_t$, in a vertical direction defined by a y-direction and a gravitational flow flux, $j_g$, accounting for a levitation effect:

$$j_t + j_g = 0 \quad \text{Equation 1.}$$

4. A method according to claim 3, wherein said void fraction distribution is analyzed by assuming that a diffusion direction of bubbles is independent of a location in a y-direction; expressing said turbulent flow flux, $j_t$, by equation 2 given below; expressing said gravitational flow flux, $j_g$, by equation 3 given below; expressing a mixing-length of a gas phase by equation 7 given below; and calculating said void fraction distribution by using a governing equation thus derived according to equation 8 given below: where $$j_t = -a_1 l_b^2 \left( \alpha \frac{\partial^2 \overline{u_L}}{\partial y^2} + \frac{\partial \alpha}{\partial y} \cdot \frac{\partial \overline{u_L}}{\partial y} \right), \quad \text{Equation 2}$$

$$j_g = -\alpha q_g, \quad \text{Equation 3}$$

-continued $$l_b = \sqrt{\frac{\rho_L}{\rho_G}} \times l_{mb}, \quad \text{Equation 7}$$

and $$a_1 \frac{\rho_L}{\rho_G} (l_{mb})^2 \left( \alpha \frac{\partial^2 \overline{u_L}}{\partial y^2} + \frac{\partial \alpha}{\partial y} \cdot \frac{\partial \overline{u_L}}{\partial y} \right) + \alpha q_g = 0 \quad \text{Equation 8}$$

wherein symbols are as defined in Table 1:

TABLE 1

| | |
|---|---|
| Q | Supply air flow rate [l/min] |
| $q_g$ | Ascending velocity of bubbles [m/s] |
| 2R | Channel height [m] |
| $T_*$ | Integral time scale [s] |
| $U_m$ | Average velocity inside channel [m/s] |
| $U_r$ | Frictional velocity [m/s] |
| u, v | Average flow velocity [m/s] |
| u', v' | Turbulent flow velocity [m/s] |
| V | Bubble volume [m³] |
| Y | y-component of bubble displacement by least square averaging [m] |
| y | Vertical distance from upper wall [m] |
| α | Local void fraction |
| $\alpha_m$ | Average void fraction within a boundary layer |
| $\eta_m$ | A numerical constant |
| $\Delta\tau_t$ | Decrement in turbulent flow stress [N/m²] |
| δ | Boundary layer thickness [m] |
| κ | A Wall-Law constant in a turbulent flow region |
| $\kappa_1$ | As above (in liquid phase with bubbles) |
| $\kappa_2$ | As above (in gas phase) |
| $\lambda_m$ | A constant representing a level of a typical turbulence |
| μ | Viscosity coefficient [Pa × s] |
| ν | Dynamic viscosity coefficient [m²/s] |
| ρ | Density [kg/m³] |
| $a_1$ | A constant of proportionality representing turbulent flow direction |
| B | A Wall-Law constant in a turbulent flow region |
| $C_f$ | Local skin-friction coefficient |
| $d_b$ | Diameter of a bubble [m] |
| g | Gravitational acceleration [m/s²] |
| $j_g$ | Vapor phase flow flux caused by levitation force [m/s] |
| $j_t$ | Vapor phase flow flux caused by turbulence |
| $k_4$ | A constant of proportionality |
| $l_b$ | Vapor phase mixing-length [m] |
| $l_m$ | Liquid phase mixing-length [m] |
| $l_{mb}$ | Changes in liquid phase mixing-length |

5. A method according to claim 4, wherein said local void fraction α is calculated according to equation 17 which is obtained by solving said equation 8 by expressing a mixing-length, $l_m$, in a gas phase in equation 9 given below; expressing a mixing-length change, $l_{mb}$, of a liquid phase in equation 11, based on parameters obtained from equations 9 and 10 given below; and assuming that equations 12 and 13 given below are applicable in a region in which velocity distributions obey a logarithmic law and that said local void fraction is independent of a location in a y-direction: where $$l_m = \kappa y \sqrt{1 - \frac{y}{R}}, \quad \text{Equation 9}$$

$$\kappa_2 = \eta_m (\alpha_m)^{2/3}, \quad \text{Equation 10}$$

$$l_{mb} = \eta_m (\alpha_m)^{2/3} y \sqrt{1 - \frac{y}{R}}, \quad \text{Equation 11}$$

$$\frac{\partial \overline{u_L}}{\partial y} = \frac{1}{\kappa_1} \left( \frac{U\tau}{y} \right), \quad \text{Equation 12}$$

-continued $$\frac{\partial^2 \overline{u_L}}{\partial y^2} = -\frac{1}{\kappa_1}\left(\frac{U\tau}{y^2}\right)$$ Equation 13 and $$\alpha = K_1(y)^{-K_0+1}\left(1-\frac{y}{R}\right)^{K_0}.$$ Equation 17

6. A method according to claim 5, wherein and a skin-friction ratio, $C_f/C_{f0}$, is calculated from equation 19 given below in accordance with a governing equation for a frictional velocity, $U_\tau$, expressed in equation 18 given below:

$$\frac{U_m}{U_\tau} = \frac{1}{\kappa_1}\ln\left(\frac{U_r R}{v_L}\right)+B-\frac{1}{\kappa_1}$$ Equation 18

$$C_f/C_{f0} = (U_\tau/U_{\tau 0})^2.$$ Equation 19

7. A method according to one of claim 5 or 6, wherein an ascending velocity of bubbles, $q_g$, is obtained from equation 21 given below by applying a Stokes equation to obtain a coefficient of friction of bubbles:

$$q_g = \rho_L g V/\{6\pi\mu_L(d_b/2)\}$$ Equation 21.

8. A method according to claim 5, wherein a proportionality constant, $\eta_m$, in equation 10 given above is a function described in equation 27 given below, and said proportionality constant, $\eta_m$, is altered in proportion to values of boundary layer thickness in a given flow field and in a different flow field so as to calculate a local void fraction, $\alpha$, in said different flow field:

$$\eta_m = \lambda_m/d_b \, \delta/d_b$$ Equation 27.

9. A method according to claim 8, wherein a proportionality constant, $\eta_m$, is first obtained experimentally in a given flow field, and a local void fraction, $\alpha$, in a different flow field is calculated by altering said proportionality constant, $\eta_m$, in proportion to a ratio of a reference boundary layer thickness in said given flow field to a boundary layer thickness $\delta$ in said different flow field.

10. A method according to claim 6, wherein a proportionality constant, $\eta_m$, in equation 10 given above is a function described in equation 27 given below, and said proportionality constant, $\eta_m$, is altered in proportion to values of boundary layer thickness in a given flow field and in a different flow field so as to calculate a local void fraction, $\alpha$, in said different flow field:

$$\eta_m = \lambda_m/d_b \, \delta/d_b$$ Equation 27.

11. A method according to claim 10, wherein a proportionality constant, $\eta_m$, is first obtained experimentally in a given flow field, and a local void fraction, $\alpha$, in a different flow field is calculated by altering said proportionality constant, $\eta_m$, in proportion to a ratio of a reference boundary layer thickness in said given flow field to a boundary layer thickness $\delta'$ in said different flow field.

12. A method according to claim 7, wherein a proportionality constant, $\eta_m$, in equation 10 given above is a function described in equation 27 given below, and said proportionality constant, $\eta_m$, is altered in proportion to values of boundary layer thickness in a given flow field and in a different flow field so as to calculate a local void fraction, $\alpha$, in said different flow field:

$$\eta_m = \lambda_m/d_b \, \delta/d_b$$ Equation 27.

13. A method according to claim 12, wherein a proportionality constant, $\eta_m$, is first obtained experimentally in a given flow field, and a local void fraction, $\alpha$, in a different flow field is calculated by altering said proportionality constant, $\eta_m$, in proportion to a ratio of a reference boundary layer thickness in said given flow field to a boundary layer thickness $\delta'$ in said different flow field.

* * * * *

UNITED STATES PATENT AND TRADEMARK OFFICE
CERTIFICATE OF CORRECTION

PATENT NO. : 6,026,758
DATED : February 22, 2000
INVENTOR(S) : Takahashi et al.

It is certified that error appears in the above-identified patent and that said Letters Patent is hereby corrected as shown below:

Col. 5, line 57, "$\eta_m \delta/d_b$" to read -- $\eta_m \propto \delta/d_b$ --.

Col. 10, line 23, "$\eta_m \delta/d_b$" to read -- $\eta_m \propto \delta/d_b$ --.

Col. 10, line 51, " $\lambda_m \delta$ " to read -- $\lambda_m \propto \delta$ --

Col. 10, line 54, "$\eta_m = \lambda_m/d_b \delta d_b$" should be -- $\eta_m = \lambda_m/d_b \propto \delta/d_b$ --

Col. 13, line 36, "$\eta_m = \lambda_m/d_b \delta d_b$" should be -- $\eta_m = \lambda_m/d_b \propto \delta/d_b$ --

Col. 14, line 13, "$\eta_m = \lambda_m/d_b \delta d_b$" should be -- $\eta_m = \lambda_m/d_b \propto \delta/d_b$ --

Col. 14, line 31, "$\eta_m = \lambda_m/d_b \delta d_b$" should be -- $\eta_m = \lambda_m/d_b \propto \delta/d_b$ --

Signed and Sealed this

Thirteenth Day of February, 2001

Attest:

NICHOLAS P. GODICI

Attesting Officer

Acting Director of the United States Patent and Trademark Office